US007809723B2

(12) United States Patent
Liu et al.

(10) Patent No.: US 7,809,723 B2
(45) Date of Patent: Oct. 5, 2010

(54) DISTRIBUTED HIERARCHICAL TEXT CLASSIFICATION FRAMEWORK

(75) Inventors: Tie-Yan Liu, Beijing (CN); Wei-Ying Ma, Beijing (CN); Hua-Jun Zeng, Beijing (CN)

(73) Assignee: Microsoft Corporation, Redmond, WA (US)

( * ) Notice: Subject to any disclaimer, the term of this patent is extended or adjusted under 35 U.S.C. 154(b) by 252 days.

(21) Appl. No.: 11/464,761

(22) Filed: Aug. 15, 2006

(65) Prior Publication Data

US 2008/0126280 A1 May 29, 2008

Related U.S. Application Data

(60) Provisional application No. 60/805,845, filed on Jun. 26, 2006.

(51) Int. Cl.
*G06F 7/00* (2006.01)
*G06F 17/30* (2006.01)
(52) U.S. Cl. ...................................... 707/736
(58) Field of Classification Search ............ 707/7, 707/3, 2, 999.007, 999.003, 999.002, 736
See application file for complete search history.

(56) References Cited

U.S. PATENT DOCUMENTS

| | | | |
|---|---|---|---|
| 5,428,778 A | 6/1995 | Brookes et al. | |
| 5,675,710 A | 10/1997 | Lewis | |
| 5,794,236 A | 8/1998 | Mehrle | |
| 5,832,470 A | 11/1998 | Morita et al. | |
| 5,870,735 A * | 2/1999 | Agrawal et al. | 707/3 |
| 6,233,575 B1 | 5/2001 | Agrawal et al. | |
| 6,507,829 B1 | 1/2003 | Richards et al. | |
| 6,553,365 B1 * | 4/2003 | Summerlin et al. | 707/2 |
| 6,556,987 B1 | 4/2003 | Brown et al. | |
| 6,826,576 B2 | 11/2004 | Lulich et al. | |
| 2002/0083039 A1 | 6/2002 | Ferrari et al. | |
| 2004/0111453 A1 | 6/2004 | Harris et al. | |
| 2008/0177680 A1 | 7/2008 | Laxman et al. | |
| 2008/0177684 A1 | 7/2008 | Laxman et al. | |

OTHER PUBLICATIONS

U.S. Appl. No. 11/625,249, Laxman.
U.S. Appl. No. 11/625,266, Laxman.
Akbani, Rehan et al., "Applying Support Vector Machines to Imbalanced Datasets," ECML 2004, LNAI 3201, ©Springer-Verlag Berlin Heidelberg 2004, pp. 39-50.
Bottou, Leon et al., "Comparison of Classifier Methods: A Case Study in Handwritten Digit Recognition," JCPR, Oct. 1994, 11 pages.
Boyapati, Vijay, "Improving Hierarchical Text Classification Using Unlabeled Data," SIGIR'02 Tampere, Finland, ACM, pp. 363-364.

(Continued)

*Primary Examiner*—Mohammad Ali
*Assistant Examiner*—Alexey Shmatov
(74) *Attorney, Agent, or Firm*—Perkins Coie LLP

(57) ABSTRACT

A method and system for distributed training of a hierarchical classifier for classifying documents using a classification hierarchy is provided. A training system provides training data that includes the documents and classifications of the documents within the classification hierarchy. The training system distributes the training of the classifiers of the hierarchical classifier to various agents so that the classifiers can be trained in parallel. For each classifier, the training system identifies an agent that is to train the classifier. Each agent then trains its classifiers.

15 Claims, 11 Drawing Sheets

OTHER PUBLICATIONS

Bredensteiner, Erin J. and Kristin P. Bennett, "Multicategory Classification by Support Vector Machines," Computer Optimization and Applications, 1999, 30 pages.

CAI, Lijuan and Thomas Hofmann, "Hierarchical Document Categorization with Support Vector Machines," CIKM'04, Washington, D.C., ©2004 ACM, pp. 78-87.

Chen, Hao and Susan Dumais, "Bringing Order to the Web: Automatically Categorizing Search Results," Proceedings of CHI'00, Human Factors in Computing Systems, 2000, pp. 145-152.

Dumais, Susan and Hao Chen, "Hierarchical Classification of Web Content," SIGIR 2000, Athens, Greece, ©2000 ACM, pp. 256-263.

Dunning, Ted, "Accurate Methods for the Statistics of Surprise and Coincidence," Computational Linguistics, vol. 19, No. 1, 1993, ©1993 Association for Computational Linguistics, pp. 61-74.

Forman, George, "An Extensive Empirical Study of Feature Selection Metrics for Text Classification," Journal of Machine Learning Research 3, 2003, ©2003 Hewlett-Packard, pp. 1289-1305.

Ghani, Rayid, "Using Error-Correcting Codes for Text Classification," ICML, 2000, pp. 303-310.

Granitzer, Michael, "Hierarchical Text Classification using Methods from Machine Learning," Oct. 27, 2003, Master's Thesis at Graz University of Technology, 104 pages.

Hersh, William et al., "OHSUMED: An Interactive Retrieval Evaluation and New Large Test Collection for Research," SIGIR 1994, pp. 192-201.

Hsu, Chih-Wei and Chih-Jen Lin, "A Comparison of Methods for Multi-class Support Vector Machines," Technical Report, Department of Computer Science and Information Engineering, National Taiwan University, 2001, 26 pages.

Joachims, Thorsten, "Making Large-Scale SVM Learning Practical," LS-8 Report 24, Jun. 15, 1998, University of Dortmund, Computer Science Department, 17 pages.

Lewis, David D. at al., "RCV1: A New Benchmark Collection for Text Categorization Research," Journal of Machine Learning Research, 5, 2004, pp. 361-397.

Lewis, David D., "Reuters-21578," Test Collections, 1 page, http://www.daviddlewis.com/resources/testcollections/reuters21578.

Platt, John C., "Fast Training of Support Vector Machines using Sequential Minimal Optimization," Advances in Kernel Methods—Support Vector Learning, MIT Press, 1999, pp. 185-208.

Sastry, P. S., "An introduction to Support Vector Machines," Published as a Chapter in J.C. Misra (ed), Computing and Information Sciences: Recent Trends, Narosa Publishing House, New Delhi, 2003, pp. 1-44.

Sebastiani, Fabrizio, "Machine Learning in Automated Text Categorization," ACM Computing Surveys, vol. 34, No. 1, Mar. 2002, ©2002 ACM, pp. 1-47.

Sun, Aixin and Ee-Peng Lim, "Hierarchical Text Classification and Evaluation," ICDM, 2001, pp. 521-528.

Yang, Huai-Yuan et al., "Heterogeneous Information Integration in Hierarchical Text Classification," PAKDD, 2006, pp. 240-249.

Yang, Yiming and Xin Liu, "A re-examination of text categorization methods," SIGIR'99, Berkley, California, ©1999 ACM, pp. 42-49.

Yang, Yiming, "A Study on Thresholding Strategies for Text Categorization," SIGIR'01, New Orleans, Louisiana, ©2001 ACM, pp. 137-145.

Yang, Yiming, Jian Zhang and Bryan Kisiel, "A Scalability Analysis of Classifiers in Text Categorization," SIGIR'03, Toronto, Canada, ©2003 ACM, pp. 96-103.

Lewis, David D., "Reuters-21578", Test Collections, 1 page, WayBackMachine: "http://web.archive.org/web/20040604003920/http://www.daviddlewis.com/resources/testcollections/reuters21578/", Jun. 4, 2004.

* cited by examiner

DISTRIBUTED HIERARCHICAL TEXT CLASSIFICATION FRAMEWORK

CROSS-REFERENCE TO RELATED APPLICATION(S)

This application claims the benefit of U.S. Provisional Application No. 60/805,845 entitled "SUPPORT VECTOR MACHINES CLASSIFICATION WITH A VERY LARGE-SCALE TAXONOMY," filed Jun. 26, 2006, which application is hereby incorporated by reference in its entirety.

BACKGROUND

Many search engine services, such as Google and Overture, provide for searching for information that is accessible via the Internet. These search engine services allow users to search for display pages, such as web pages, that may be of interest to users. After a user submits a search request (i.e., a query) that includes search terms, the search engine service identifies web pages that may be related to those search terms. To quickly identify related web pages, the search engine services may maintain a mapping of keywords to web pages. This mapping may be generated by "crawling" the web (i.e., the World Wide Web) to identify the keywords of each web page. To crawl the web, a search engine service may use a list of root web pages to identify all web pages that are accessible through those root web pages. The keywords of any particular web page can be identified using various well-known information retrieval techniques, such as identifying the words of a headline, the words supplied in the metadata of the web page, the words that are highlighted, and so on. The search engine service identifies web pages that may be related to the search request based on how well the keywords of a web page match the words of the query. The search engine service then displays to the user links to the identified web pages in an order that is based on a ranking that may be determined by their relevance to the query, popularity, importance, and/or some other measure.

Because of the vast number of web sites and web pages, a search engine service may identify hundreds of thousands of web pages and that may match a query. A user, however, may be interested in web pages on one topic, but the search engine service may return web pages on many different topics. For example, an attorney who submits the query "L.A. court time" may get the same query result as an athlete who submits the same query. In such a case, web pages related to superior court times in Los Angeles County may be relevant to the attorney, but irrelevant to the athlete who may be interested in web pages related to sport court times of the Los Angeles Parks and Recreation Department. A search engine service may not know whether the user is interested in law or sports and thus cannot always rank the web pages based on the relevance to the user. If the search engine service does not rank the web pages that are of interest to the user appropriately, then it can be difficult for the user to review the textual excerpts displayed with a large number of query results to determine whether the described web pages are of interest. Moreover, a user may need to actually view many web pages before finding one of interest because the textual excerpts may not provide enough information to determine the relevance of the web pages. For example, the textual excerpt of a query result may state, "This web page helps you check on L.A. court times at your convenience . . . if you need to arrange a court time . . . . Please arrive 15 minutes before your scheduled court time." In such a case, the user may not know whether the web page is about legal or sport courts.

Some search engine services provide a classification hierarchy for web pages to assist in locating web pages of interest to a user. FIG. 1 illustrates a portion of an example classification hierarchy. In this example, a classification hierarchy 100 includes a service classification 101 corresponding to web pages related to services. The service classification has a recreation classification 110 and a business classification 150 as sub-classifications. The recreation classification has a sports classification 120 and a dancing classification 130 as sub-classifications. The sports classification has a baseball classification 121 and a football classification 122 as sub-classifications, and the dancing classification has a folk dance classification 131 and a rock 'n roll classification 132 as sub-classifications. The business classification has an insurance classification 160 and a financial classification 170 as sub-classifications. The financial classification has a stock market classification 171 and a bonds classification 172 as sub-classifications. Each web page within the service classification is associated with a classification path leading to a leaf classification such as classifications 121-122, 131-132, 160, and 171-172. For example, a web page relating to baseball would be classified into the service classification, the recreation classification, the sports classification, and the baseball classification. As another example, a web page relating to insurance would be classified into the service classification, the business classification, and the insurance classification. When a search engine service crawls the web, it may identify the classifications of the web pages that it encounters and create an index that maps classifications to the web pages within the classifications.

To assist a user in searching, a search engine service may allow the user to specify a classification of interest as part of the query. For example, a user who is interested in superior court times of Los Angeles County may enter the query "L.A. court times" and specify the classification of "criminal justice." The search engine service may search for only web pages within the specified classification (e.g., criminal justice) and related classifications (e.g., legal). Alternatively, a search engine service may search for web pages in all classifications and then present the search results organized by classification of the web pages. In such a case, a user could then fairly quickly select the classification of interest and review the web pages within that classification.

Although the classification of web pages is a specific type of classification within the field of Text Classification ("TC"), the classification of web pages presents many challenges not encountered with traditional text classification. A significant challenge is the efficient classification of large numbers of web pages. Traditional text classification techniques have used supervised learning to develop a classifier to classify documents (e.g., published papers and news articles) into non-hierarchical classifications. These supervised learning techniques, however, cannot effectively be used to train a classifier for the hundreds of thousands of classifications used by some search engine services. These traditional supervised learning techniques include Support Vector Machines ("SVMs"), k-Nearest Neighbor ("k-NN"), Naïve Bayes ("NB"), and other algorithms. These supervised learning techniques input training data (e.g., documents with their corresponding classifications), generate a feature vector for each document, and generate a classifier that can be used to classify other documents represented by their feature vectors. A feature vector may, for example, contain the number of occurrences of each term or keyword in the document. An SVM is a supervised learning technique that operates by finding a hyper-surface in the space of possible inputs. The hyper-surface attempts to split the positive examples from the negative examples by maximizing the distance between the nearest of the positive and negative examples to the hypersurface. This allows for correct classification of data that is similar to but not identical to the training data. Various techniques can be used by a support vector machine. One technique uses a sequential minimal optimization algorithm that breaks the large quadratic programming problem down into a series of small quadratic programming problems that can be solved analytically. (See Sequential Minimal Optimization, available at Microsoft Research web site as "~iplatt/smo.html.")

The use of a hierarchical classifier has been proposed to classify documents in general and web pages in particular using a classification hierarchy with many thousands of classifications. A hierarchical classifier typically has a classifier for each classification. Each classifier is trained to classify documents within a certain classification into its sub-classifications. For example, a classifier for the sports classification 120 of FIG. 1 would classify sports related web pages into the sub-classifications of baseball and football. Because a hierarchical classifier can comprise hundreds of thousands of classifiers (e.g., one for each non-leaf classification), it can be particularly time-consuming to effectively train such a large number of classifiers.

SUMMARY

A method and system for distributed training of a hierarchical classifier for classifying documents using a classification hierarchy is provided. A training system provides training data that includes the documents and classifications of the documents within the classification hierarchy. The training system distributes the training of the classifiers of the hierarchical classifier to various agents so that the classifiers can be trained in parallel. For each classifier, the training system identifies an agent that is to train the classifier. Each agent then trains its classifiers. In addition, the training system my use a load balancing technique to ensure that each agent has an approximately equal training load so that the agents complete their training at approximately the same time. The training system may also use a Chi-Squared technique to select features to represent documents. The training system may train a classifier for a classification and select a confidence threshold for being within that classification using a multifold cross validation technique. The training system may, for each classification, train and cross validate multiple classifiers and select a confidence threshold for each classifier. The training system the sets the confidence level for the classifier of that classification to the average of the confidence thresholds.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
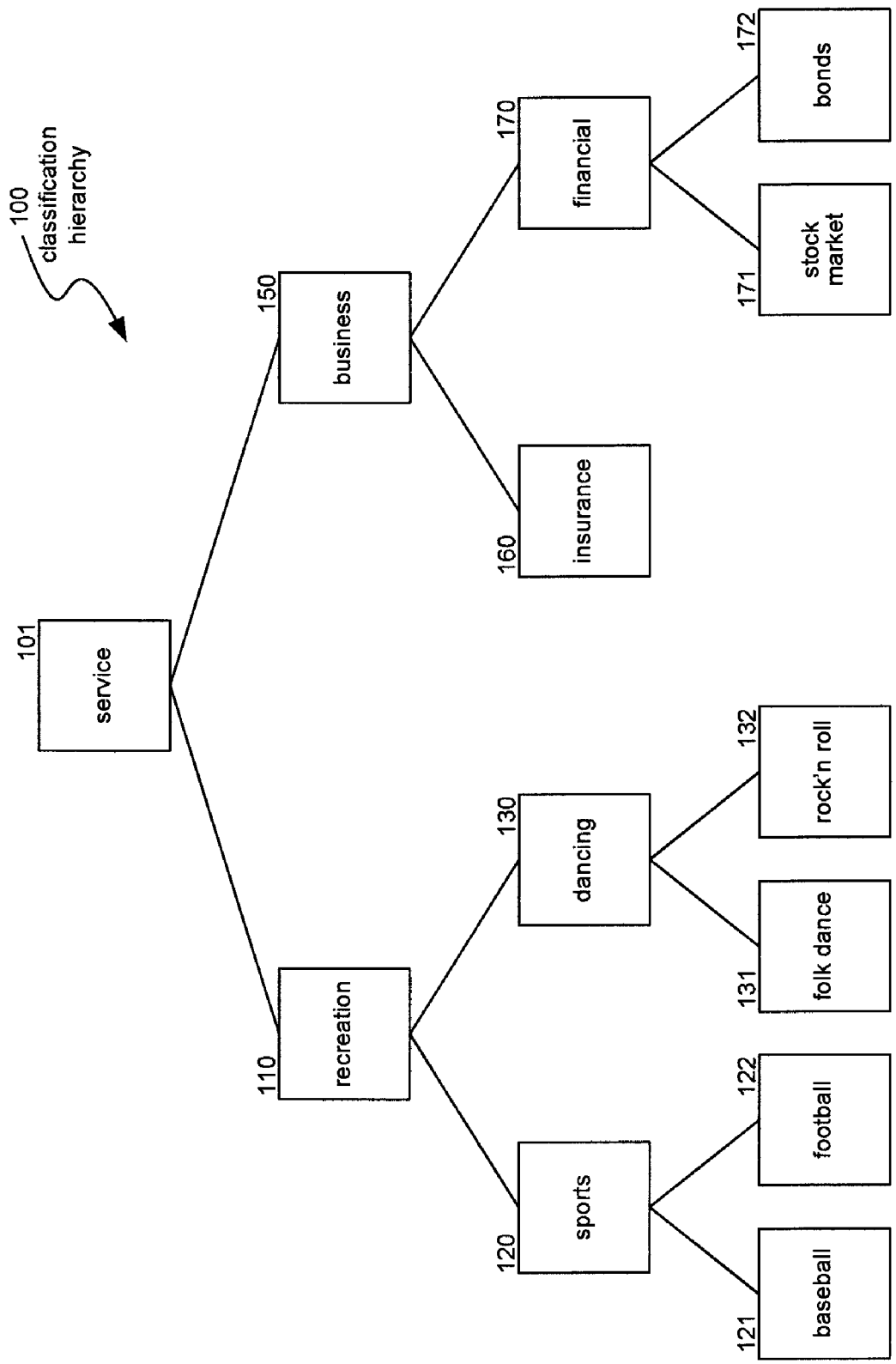
FIG. 1 illustrates a portion of an example classification hierarchy.

A method and system for distributed training of a hierarchical classifier for classifying documents using a classification hierarchy is provided. In one embodiment, a training system is provided training data that includes the documents, which may be represented by their feature vectors, and classifications of the documents within the classification hierarchy. The training system distributes the training of the classifiers of the hierarchical classifier to various agents (e.g., computing systems) so that the classifiers can be trained in parallel. For each classifier, the training system identifies an agent that is to train the classifier (i.e., assigns a classifier to an agent). Each agent then trains the classifiers that have been assigned to it using the training data associated with the classifications of those classifiers. For example, if 20,000 classifiers are to be trained to implement a hierarchical classifier and 10 agents are available for training, then the training system may assign 2,000 classifiers to each agent. The training system may include a controller (e.g., a computing system) that is responsible for assigning classifiers to agents and notifying the agents of their assigned classifiers. Alternatively, rather than having a controller assign classifiers, each agent may perform an algorithm that identifies the classifiers that are to be assigned to it. For example, the classifiers and the agents may be sequentially numbered starting from one. The algorithm may assign to an agent those classifiers whose numbers are a multiple of the number of the agent. As another example, the training system may queue the classifiers. Each agent may remove a certain number of classifiers from the queue, train those classifiers, and repeat the process until the queue is empty. To train its classifiers, each agent needs to have access to the appropriate portions of the training data. When the training of all the classifiers is completed by the agents, then the classifiers implement the hierarchical classifier. The distributed training allows effective and efficient generation of hierarchical classifiers with thousands of classifiers.

In one embodiment, the training system may use binary classifiers to implement a hierarchical classifier. The training system may train the binary classifiers using a linear SVM. A binary classifier for a classification classifies documents as either being in or not in that classification with a certain confidence. For example, when a document relating to basketball is input to a binary classifier for a sports classification, the binary classifier may indicate that the document is in the sports classification with a confidence score of 0.9. In contrast, when a document relating to a superior court is input to that same binary classifier, it may indicate that the document is not in the sports classification with a confidence score of 0.8. To determine the correct sub-classification for a document with a certain classification, a hierarchical classifier using binary classifiers applies each classifier for the sub-classifications. For example, when a document is classified with the sports classification, the hierarchical classifier applies to the document the binary classifiers for the baseball and football classifications. The hierarchical classifier then selects the classification whose binary classifier indicates the highest confidence level of being within the classification. A hierarchical classifier may use a pachinko-machine search strategy to find the most appropriate classification. Using such a strategy, the hierarchical classifier selects sub-classifications that have a high confidence of being a correct classification and repeatedly applies classifiers of those sub-classifications until a leaf classification is reached or all the classifiers for sub-classifications indicate a high confidence of being an incorrect classification.

In one embodiment, the training system may attempt to balance the training load that is assigned to the agents. Because classifications higher in the classification hierarchy will have much more training data than classifications lower in the classification hierarchy, it will take longer to train classifiers for the higher classifications. A goal of the training system is to assign classifiers to agents so that each agent will complete its training at approximately the same time. As discussed above, if 10 agents are available to train 20,000 classifiers, then if one agent is assigned classifiers for the 2,000 highest classifications and another agent is assigned classifiers for the 2,000 lowest classifications, then the agent that is assigned the classifiers for the lowest classifications will likely complete much sooner. Thus, the training system assigns classifiers to agents based on the anticipated complexity or load of training of each classifier. The complexity of training a classifier using a linear SVM may be represented by the following equation:

$$O(M_i N_i^c) \tag{1}$$

where O means "on the order of," $M_i$ represents the number of classifications of the classifier (e.g., two in the case of a binary classifier) for classification i, $N_i$ represents the number of training documents for classification i, and c represents a number between 1.2 and 1.5. One skilled in the art will appreciate that the complexity of training a classifier will vary depending on the training technique selected. For example, a Naïve Bayes training technique will have a different complexity equation than an SVM training technique. The training system may initially calculate the complexity for each classifier using Equation 1. The training system then assigns classifiers to agents based on the complexity of the classifiers already assigned to the agents. For example, if there are 10 agents, the training system may first assign to each agent one of the classifiers with the 10 highest complexities. The training system then assigns classifiers to agents in order of complexity of the classifiers. The training system repeatedly assigns the unassigned classifier with the highest complexity to the agent whose total complexity of assigned classifiers is the lowest until all the classifiers are assigned. Alternatively, the training system may initially randomly assign one classifier to each agent and then repeatedly assign the unassigned classifier with the highest complexity as described above. Alternatively, various algorithms and search strategies may be used to minimize the difference in total complexity of classifiers assigned to the agents.

In one embodiment, the training system may use a Chi-Squared feature selection algorithm to reduce the dimensionality of the features used for training. If a feature vector contains an entry for each possible word except stop words (e.g., a, the, and), then it may have a very high dimension, which significantly increases the complexity of training. To reduce the complexity of training, the training system selects and uses only a subset of the features for each classification based on scores of the features in the training data for that classification. As a result, the sports classification may have a different set of features from the insurance classification. The training system may select the features for a classification with the highest scores as represented by the following equation:

$$\chi^2(t, c) = \frac{N \times (AD - CB)^2}{(A + C) \times (B + D) \times (A + B) \times (C + D)} \tag{21}$$

where t represents the feature, c represents a classification, A represents the number of documents in the training data with classification c that contain feature t, B represents the number of documents in the training data with classifications other than classification c that contain feature t, C represents the number of documents in the training data with classification c that do not contain feature t, D represents the number of documents in the training data with classifications other than classification c that do not contain feature t, and N is the total number of documents in the training data.

In one embodiment, the training system uses a multi-fold cross validation technique to select a confidence threshold for each binary classifier. A confidence threshold for a classification indicates the minimum confidence score to be used for classifying a document into that classification. To establish a confidence level for a classification, the training system divides the training data for that classification into multiple parts or N parts. The training system trains the classifier for that classification using the training data of all but one part or N−1 parts. The training system holds out one part for cross validation. If a classification does not have N training documents, the training system sets N to the number of training documents so that each part has at least one document within the classification. After the training system trains a classifier using the documents of the N−1 parts, the training system then applies the trained classifier to the documents of the holdout part. The training system selects a confidence threshold that tends to maximize the F1 score of the classifier, which is a statistical measure of the classifier's accuracy based on the precision and the recall of the classifier. The precision is the percentage of the documents classified by the classifier in a classification that are correctly classified, and the recall is the percentage of the documents in a classification that are correctly classified by the classifier. Since the F1 score is discrete, many different thresholds may correspond to the same F1 score. In one embodiment, the training system selects the confidence threshold corresponding to the middle of the largest interval that results with the maximum F1 score. The training system may train N classifiers for each classification holding out each part once for each classifier. The training system may then average the N confidence thresholds to give the final confidence threshold for the classifier. The training system may then train a final classifier using all the training data (i.e., N parts) to give the final classifier. Alternatively, the training system may average the N classifiers previously trained to give the final classifier.

Figure 2:
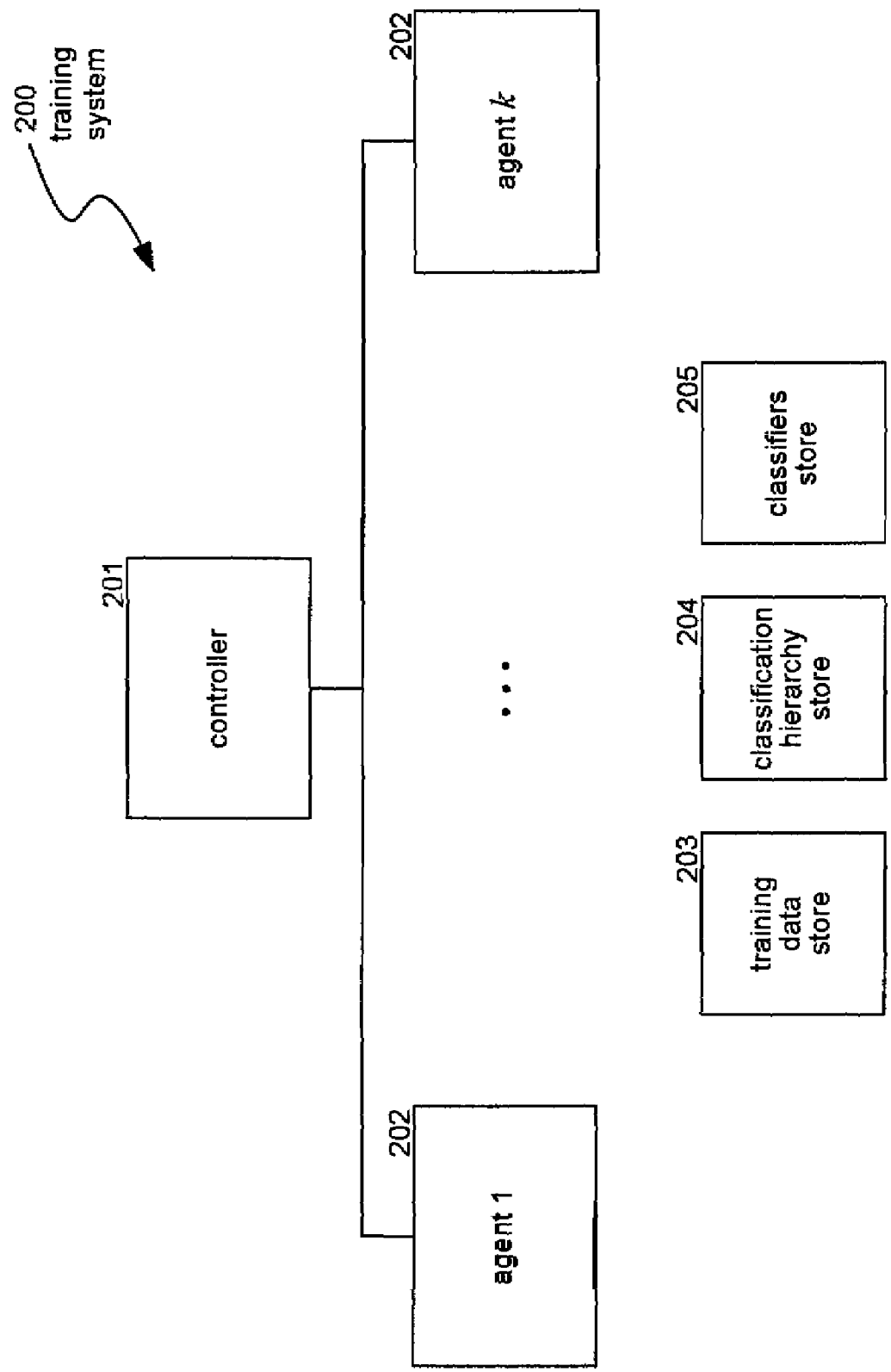
FIG. 2 is a block diagram that illustrates the overall architecture of the training system in one embodiment.

FIG. 2 is a block diagram that illustrates the overall architecture of the training system in one embodiment. The training system 200 includes a controller 201 and agents 202. The training system also includes a training data store 203, a classification hierarchy store 204, and a classifier store 205. The controller assigns the training of classifiers to the agents. Each agent trains the classifiers that have been assigned to it. The controller has access to the training data store and the classification hierarchy store. The agents have access to the training data store and the classifier store. The training data store contains the training data that includes documents, which may be represented by their feature vectors, and their classifications. The classification hierarchy store contains the hierarchy of the classifications. The classifier store contains the classifiers trained by the agents along with their confidence thresholds and represents the hierarchical classifier. Although not shown, the training system may also include a store for storing the features selected for each classification.

Figure 3:
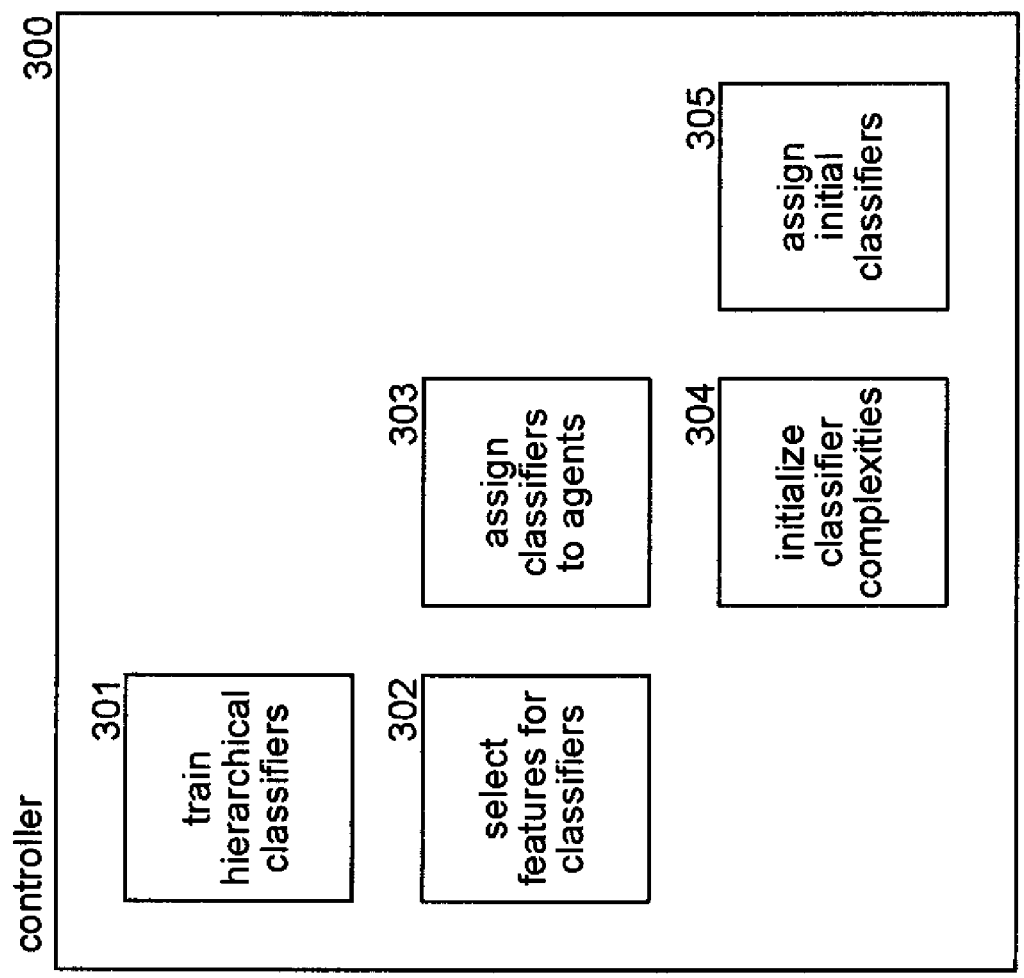
FIG. 3 is a block diagram that illustrates components of a controller component that executes on a controller of the training system in one embodiment.

FIG. 3 is a block diagram that illustrates components of a controller component that executes on a controller of the training system in one embodiment. A controller component 300 includes a train hierarchical classifier component 301, a select features for classifiers component 302, an assign classifiers to agents component 303, an initialize classifier complexities component 304, and an assign initial classifiers component 305. The train hierarchical classifier component invokes the select features for classifiers component and then invokes the assign classifiers to agents component to assign the classifiers to the agents for training. The assign classifiers to agents component invokes the initialize classifier complexities component to determine the complexities of training each classifier and invokes the assign initial classifiers component to assign the initial classifiers to the agents. The assign classifiers to agents component then loops assigning unassigned classifiers to agents based on complexity of classifiers currently assigned to the agents.

Figure 4:
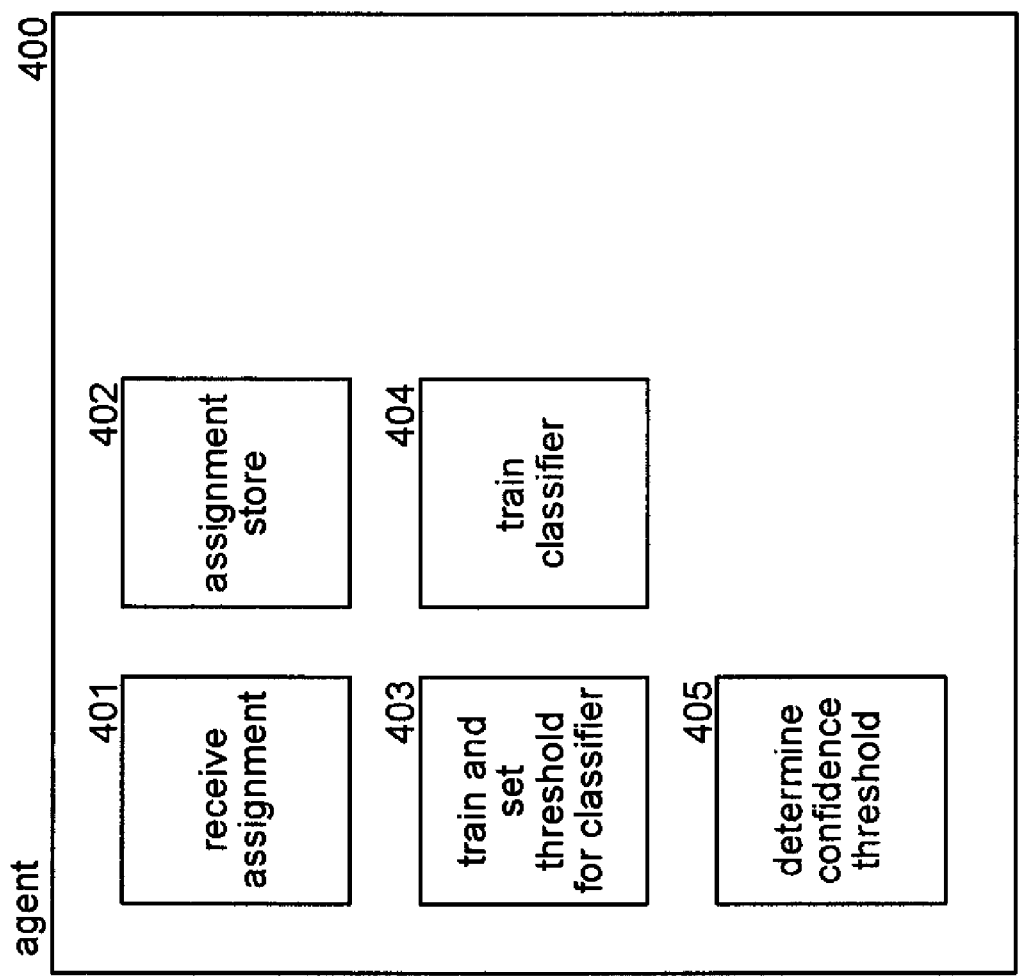
FIG. 4 is a block diagram that illustrates components of an agent component that executes on an agent of the training system in one embodiment.

FIG. 4 is a block diagram that illustrates components of an agent component that executes on an agent of the training system in one embodiment. An agent component 400 includes a receive assignment component 401 and an assignment store 402. The receive assignment component receives assignments to train certain classifiers from the controller and stores an indication of those assignments in the assignment store. The agent component also includes a train and set threshold for classifier component 403, a train classifier component 404, and a determine confidence threshold component 405. The train and set threshold for classifier component invokes the train classifier component and the determine confidence threshold component to perform cross validation training and set the confidence threshold for the classifiers assigned to the agent component.

The computing devices on which the training system may be implemented may include a central processing unit, memory, input devices (e.g., keyboard and pointing devices), output devices (e.g., display devices), and storage devices (e.g., disk drives). The memory and storage devices are computer-readable media that may contain instructions that implement the training system. In addition, the instructions, data structures, and message structures may be stored or transmitted via a data transmission medium, such as a signal on a communications link. Various communications links may be used, such as the Internet, a local area network, a wide area network, or a point-to-point dial-up connection.

The training system may be implemented on various computing systems or devices including personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The training system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments. For example, the training system may or may not include a crawler or a search engine.

Figure 5:
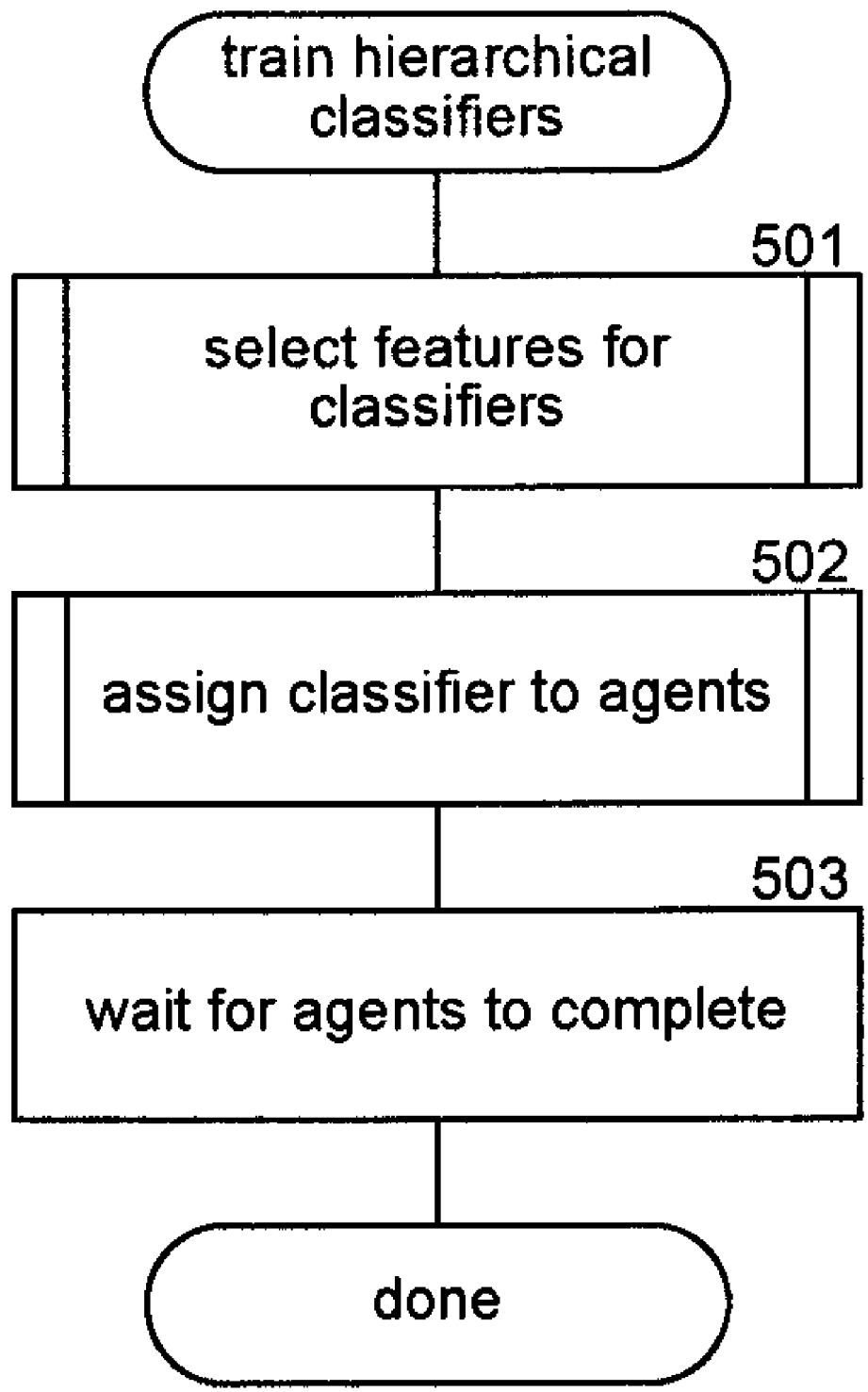
FIG. 5 is a flow diagram that illustrates the processing of a train hierarchical classifier component of the training system in one embodiment.

FIG. 5 is a flow diagram that illustrates the processing of the train hierarchical classifier component of the training system in one embodiment. The component may be implemented on the controller of the training system. In block 501, the component invokes the select features for classifiers component to select the features for each classifier using a Chi-Squared technique. Alternatively, each agent may select the features for the classifiers assigned to it, rather than having the controller select the features for all classifiers. In block 502, the component invokes the assign classifiers to agents component. Alternatively, each agent may have a component that identifies the classifiers assigned to it, rather than having the controller assign the classifiers. In block 503, the component waits for the agents to complete and then completes.

Figure 6:
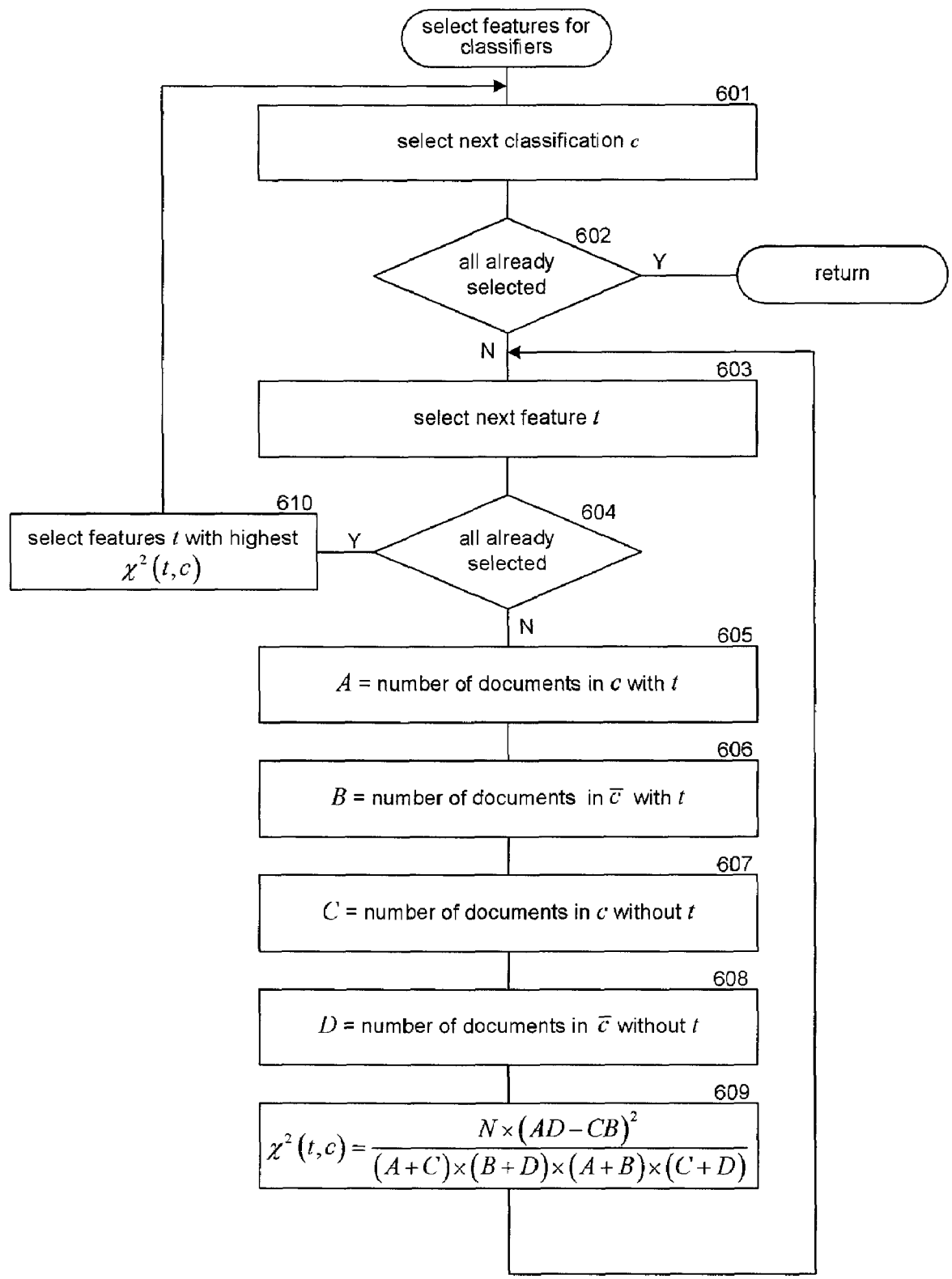
FIG. 6 is a flow diagram that illustrates the processing of the select features for classifiers component of the training system in one embodiment.

FIG. 6 is a flow diagram that illustrates the processing of the select features for classifiers component of the training system in one embodiment. The component loops selecting each classification and selecting the features for the classifier of that classification. In block 601, the component selects the next classification. In decision block 602, if all the classifications have already been selected, then the component returns, else the component continues at block 603. In blocks 603-609, the component loops selecting all features and generating a score for each selected feature. In block 603, the component selects the next feature. In decision block 604, if all the features have already been selected, then the component continues at block 610, else the component continues at block 605. In block 605, the component counts the number of documents in the selected classification with the selected feature. In block 606, the component counts the number of documents not in the selected classification with the selected feature. In block 607, the component counts the number of documents in the selected classification without the selected feature. In block 608, the component counts the number of documents not in the selected classification without the select feature. In block 609, the component calculates the CHI-square score for the selected feature of the selected classification and then loops to block 603 to select the next feature for the selected classification. In block 610, the component selects the features with the highest Chi-Squared score to be the features for the selected classification. The component then loops to block 601 to select the next classification.

Figure 7:
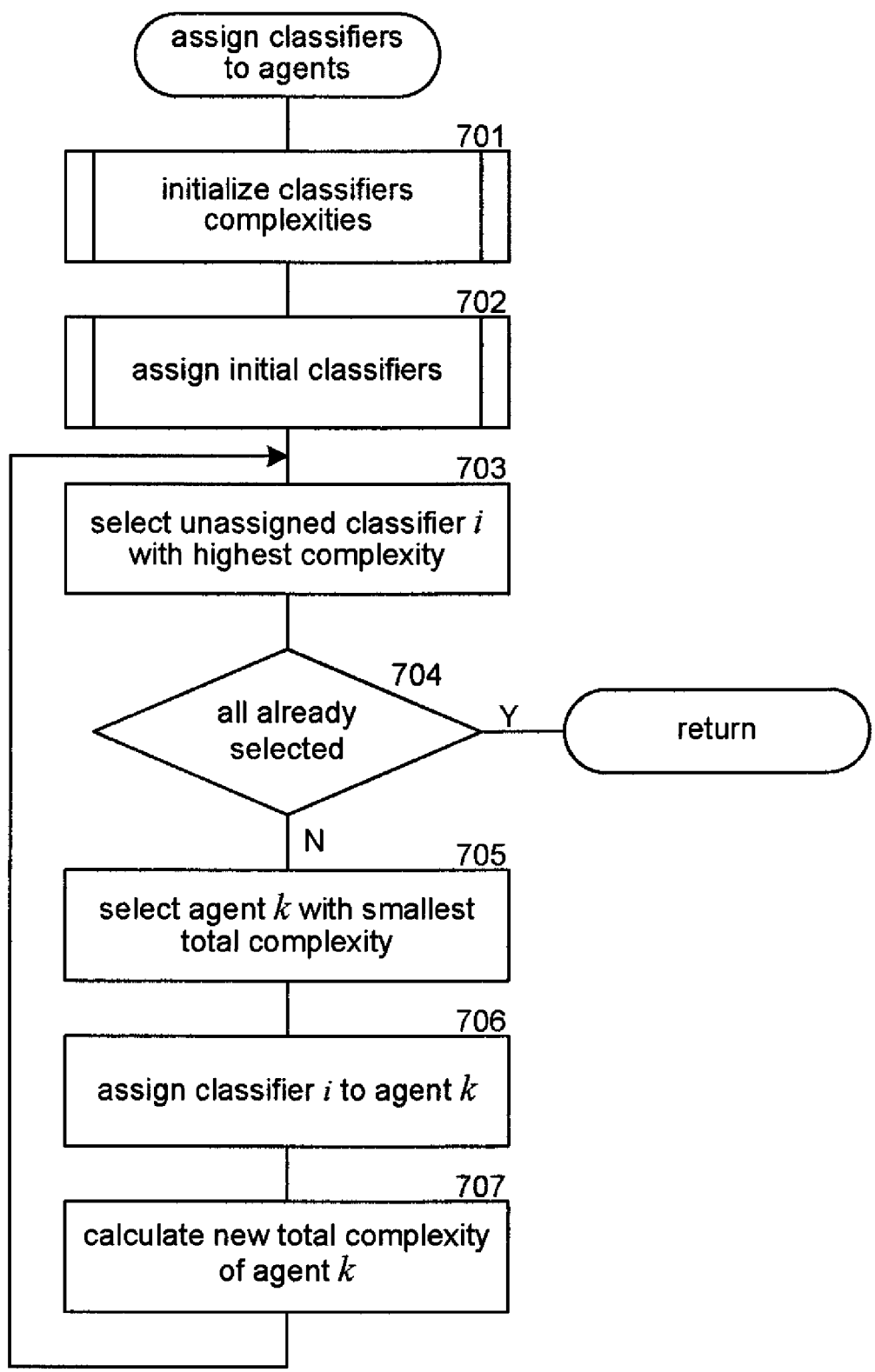
FIG. 7 is a flow diagram that illustrates the processing of the assign classifiers to agents component of the training system in one embodiment.

FIG. 7 is a flow diagram that illustrates the processing of the assign classifiers to agents component of the training system in one embodiment. The component calculates the complexities of training the classifiers and then loops assigning the classifiers to the agents. In block 701, the component invokes the initialize classifier complexities component to calculate the complexities of training the classifiers. In block 702, the component invokes the assign initial classifiers component to assign one classifier to each agent. In blocks 703-707, the component loops selecting each unassigned classifier and assigning it to an agent. In block 703, the component selects the unassigned classifier with the highest complexity. In decision block 704, if all the unassigned classifiers have already been selected, then the component returns, else the component continues at block 705. In block 705, the component selects the next agent with the smallest total complexity. In block 706, the component assigns the selected classifier to the selected agent. In block 707, the component calculates a new total complexity for the selected agent by adding the complexity of the newly assigned classifier to the previous total complexity of the selected agent. The component then loops to block 703 to select the next unassigned classifier with the highest complexity.

Figure 8:
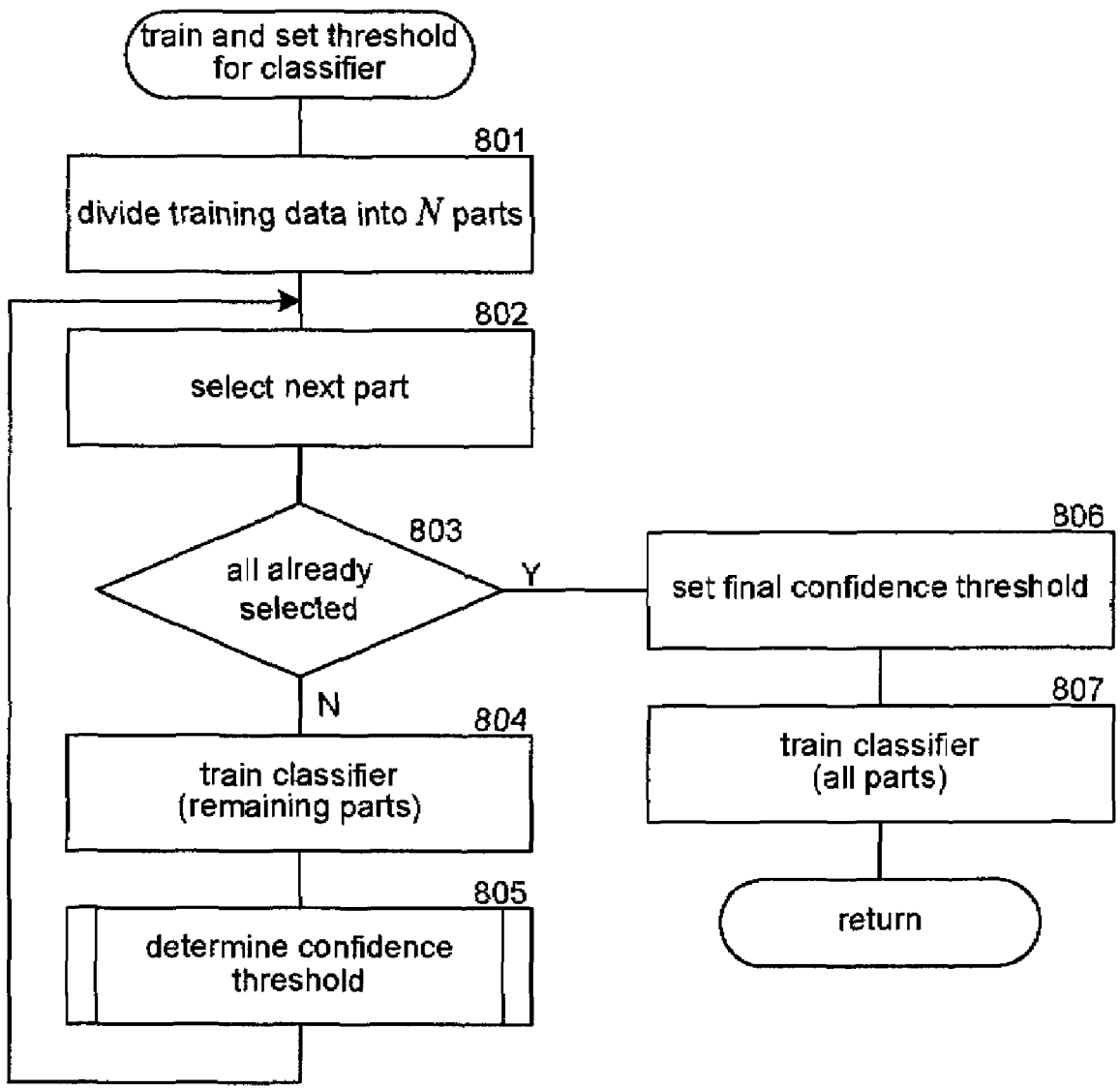
FIG. 8 is a flow diagram that illustrates the processing of the train and set threshold for classifier component of the training system in one embodiment.

FIG. 8 is a flow diagram that illustrates the processing of the train and set threshold for classifier component of the training system in one embodiment. The component trains a classifier and sets a confidence threshold for the classifier. In block 801, the component divides the training data into multiple parts. In blocks 802-805, the component loops selecting a holdout part and training a classifier using the remaining parts. In block 802, the component selects the next part to be a holdout part. In decision block 803, if all the parts have already been selected for holding out, then the component continues at block 806, else the component continues at block 804. In block 804, the component trains the classifiers using the remaining parts. In block 805, the component invokes the determine confidence threshold component to calculate the confidence threshold for the trained classifier. The component then loops to block 802 to select the next part of the training data for holding out. In block 806, the component calculates the final confidence threshold as the average of the confidence thresholds for the trained classifiers. In block 807, the component trains a classifier using all parts and then completes.

Figure 9:
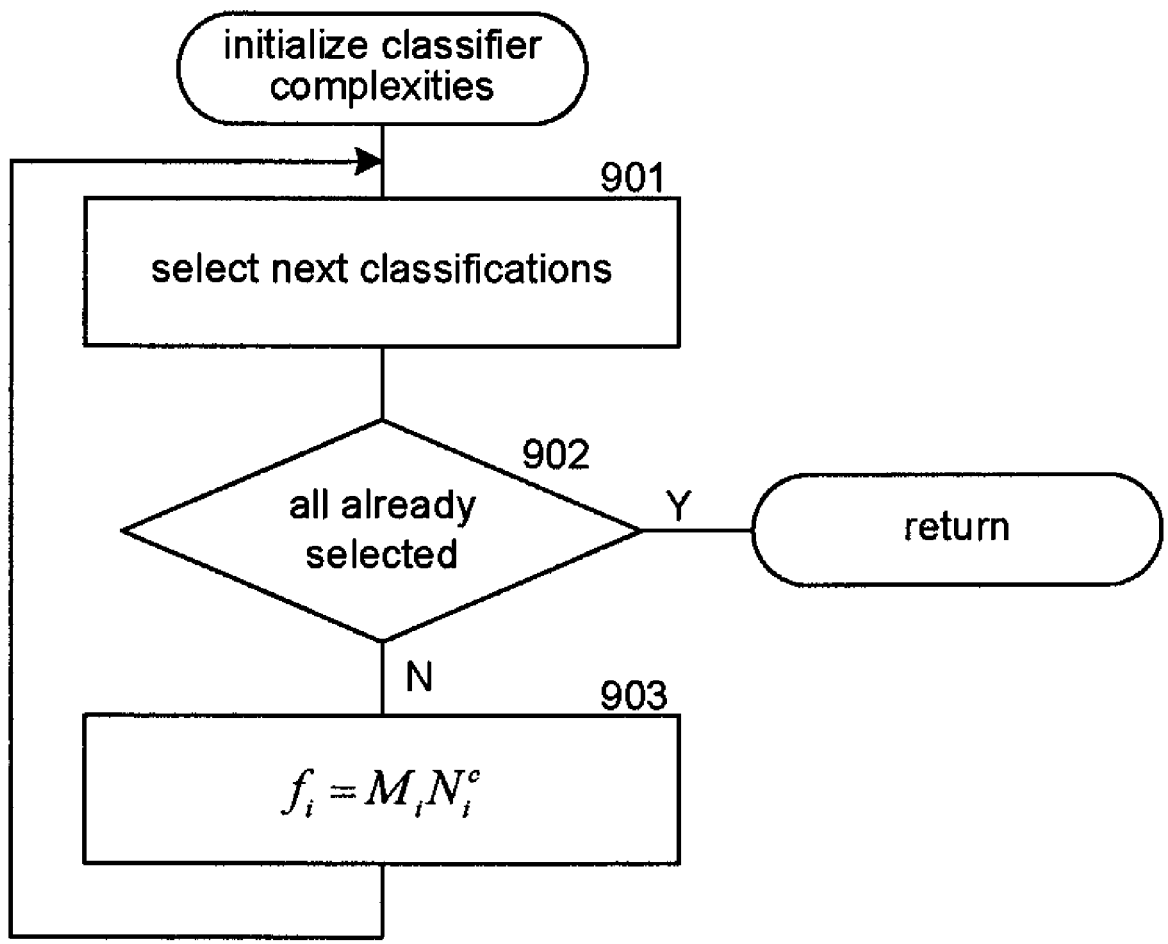
FIG. 9 is a flow diagram that illustrates the processing of the initialize classifier complexities component of the training system in one embodiment.

FIG. 9 is a flow diagram that illustrates the processing of the initialize classifier complexities component of the training system in one embodiment. The component loops selecting each classification and calculating the complexities for training the associated classifier. In block 901, the component selects the next classification. In decision block 902, if all the classifications have already been selected, then the component returns, else the component continues at block 903. In block 903, the component calculates the complexities for the selected classification using Equation 1. The component then loops to block 901 to select the next classification.

Figure 10:
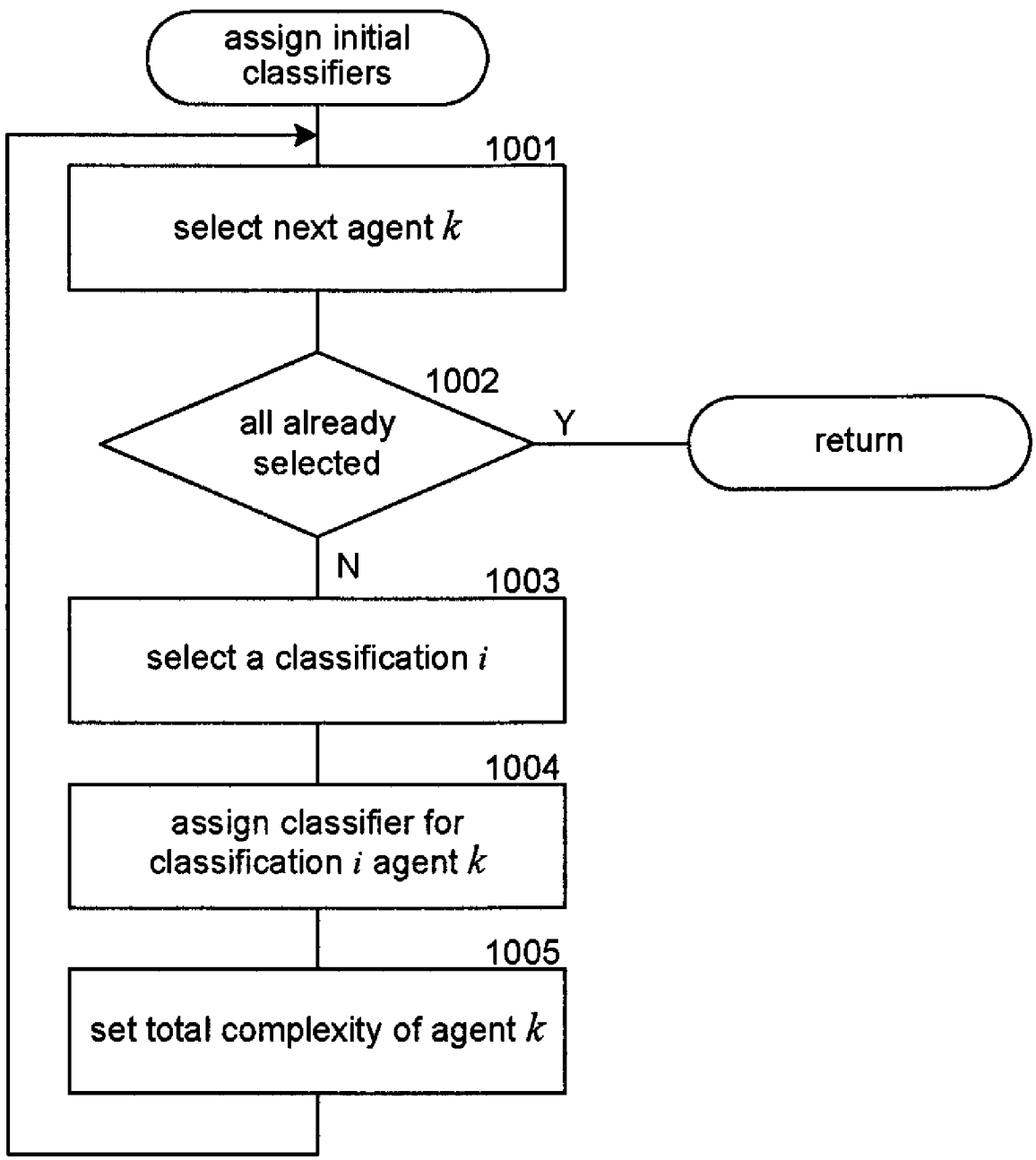
FIG. 10 is a flow diagram that illustrates the processing of the assign initial classifiers component of the training system in one embodiment.

FIG. 10 is a flow diagram that illustrates the processing of the assign initial classifiers component of the training system in one embodiment. The component assigns one classifier to each agent. In block 1001, the component selects the next agent. In decision block 1002, if all the agents have already been selected, then the component returns, else the component continues at block 1003. In block 1003, the component selects a classification. The component may select the classification randomly, in order of complexity, or in some other manner. In block 1004, the component assigns the classifier for the selected classification to the selected agent. In block 1005, the component sets the total complexity of the selected agent to the complexity of training the classifier for the selected classification. The component then loops to block 1001 to select the next agent.

Figure 11:
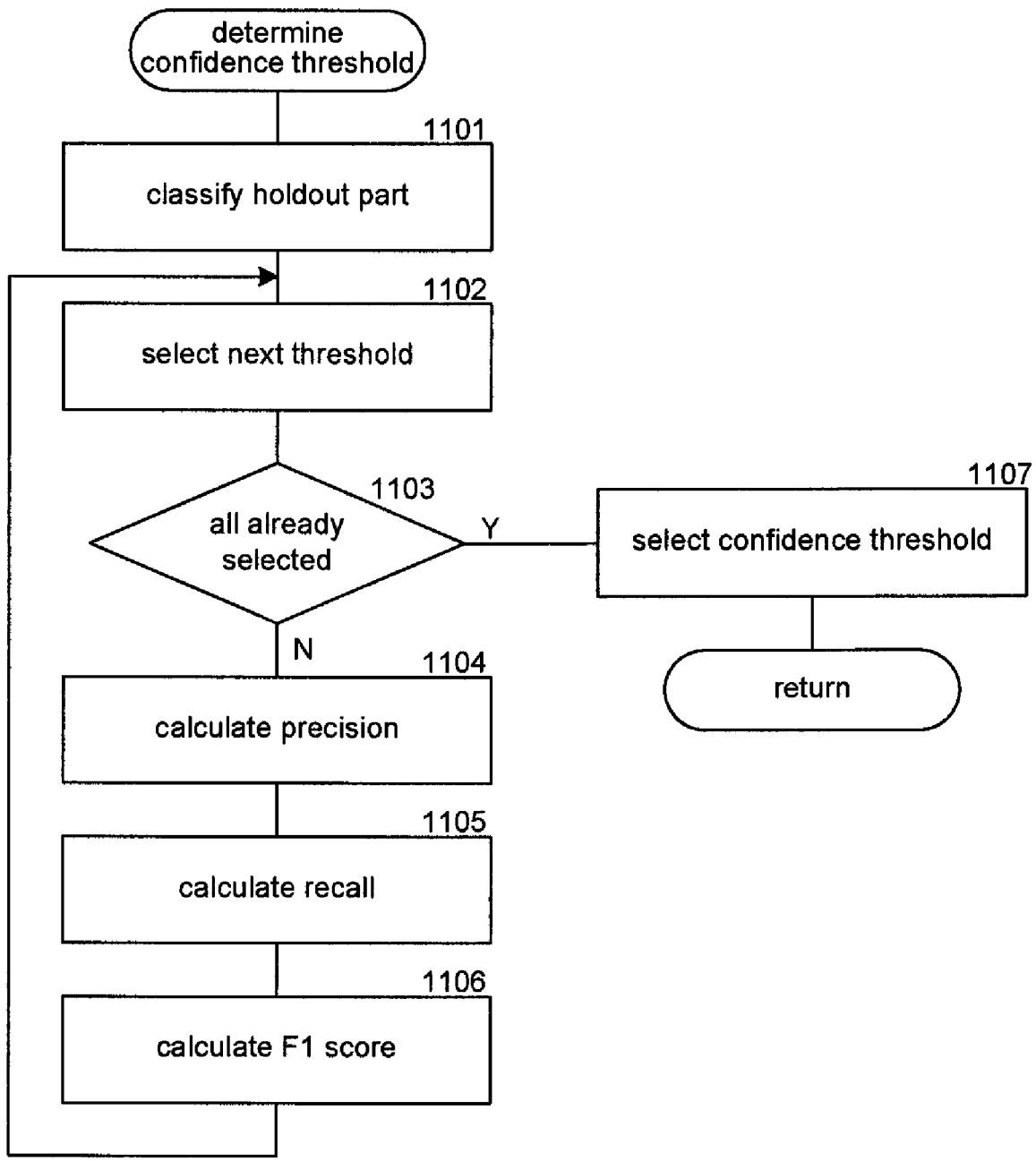
FIG. 11 is a flow diagram that illustrates the processing of the determine confidence threshold component of the training system in one embodiment.

FIG. 11 is a flow diagram that illustrates the processing of the determine confidence threshold component of the training system in one embodiment. The component classifies the documents of the holdout part and then loops calculating the F1 score for various thresholds. In block 1101, the component classifies the documents of the holdout part. In block 1102, the component selects the next threshold. In decision block 1103, if all the thresholds have already been selected, then the component continues at block 1107, else the component continues at block 1104. In block 1104, the component calculates the precision for the selected threshold. In block 1105, the component calculates the recall for the selected threshold. In block 1106, the component calculates the F1 score using the calculated precision and recall. The component then loops to block 1102 to select the next threshold. In block 1107, the component selects as the confidence threshold the middle point of the largest interval of the maximum F1 score. The component then completes.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. For example, the term "document" refers to any collection of information that can be classified into classifications. A document includes web pages, web sites, portions of web pages, books, news articles, web logs, scientific journals, resumes, abstracts, patents, patent applications, and so on. Accordingly, the invention is not limited except as by the appended claims.

We claim:

1. A method in a computing device with a processor for training a hierarchical classifier for classification of documents into a classification hierarchy, the method comprising:

providing the classification hierarchy in which classifications have sub-classifications except for leaf classifications;

providing training data for training the classifiers, the training data including documents and classifications of the documents within the classification hierarchy, the classification of a document indicating that the document is in that classification and ancestor classifications of that classification, each classification having a number of documents;

generating a classifier for each classification within the classification hierarchy by, for each classification within the classification hierarchy, determining a complexity for the classifier for the classification, the complexity of the classifier varying nonlinearly based on the number of documents within the classification;

identifying by the processor one of a plurality of agents to train the classifier for that classification such that one agent is identified to train one classifier and some of the agents are identified to train multiple classifiers, the agents being identified to balance training load of the agents that is determined based on the determined complexity of the classifiers identified to be trained by each agent wherein the identifying of one of the agents includes:

when a classifier has not yet been assigned to an agent, assigning the classifier to that agent; and when a classifier has already been assigned to each agent, assigning the classifier to an agent based on complexity of the classifier and complexities of classifiers assigned to each agent such that a classifier with the highest complexity is assigned to an agent that has been assigned classifiers with the smallest total complexity; and under control of the identified agent, training the classifier for that classification using the documents of the training data that are classified within that classification of the classification hierarchy;
wherein each agent trains classifiers for a varying number of documents of the training data,
wherein the classifiers trained by the multiple agents form the hierarchical classifier, and
wherein the agent for a classifier is identified based on number of documents used.

2. The method of claim 1 wherein each agent executes on a distinct computing device.

3. The method of claim 1 wherein each classifier is a binary classifier for a classification that classifies documents within that classification as being within or not within one sub-classification.

4. The method of claim 3 wherein the training is performed with a support vector machine.

5. The method of claim 1 wherein the classifiers are binary classifiers and the training of a classifier uses a cross validation technique to determine a confidence threshold for being within a classification.

6. The method of claim 5 including selecting a confidence threshold based on a middle of a largest interval with a maximum F1 score.

7. The method of claim 1 wherein the complexity of training a classifier is based on the number of documents in the training data times the number of classifications.

8. The method of claims 7 wherein the number of classifications for a binary classifier is two.

9. The method of claim 1 wherein a controller identifies agents to train the classifiers and notifies the identified agents.

10. A computer system with a processor and a memory for training a hierarchical classifier for classification into a classification hierarchy, comprising:
a classification hierarchy store containing a classification hierarchy in which classifications have sub-classifications except for leaf classifications;
a training data store having training data for training classifiers of the hierarchical classifier, the training data including documents and classifications of the documents within the classification hierarchy, the classification of a document indicating that the document is in that classification and ancestor classifications of that classification as specified by the classification hierarchy; and
a select features for classifier component, a controller, and a plurality of agents implemented as instructions stored in the memory for execution by the processor such that
the select features for classifier component that for each classification of the classification hierarchy, identifies features of the documents of the training data that are to be used for training a classifier for that classification;
the controller that, for each classifier of a classification within the classification hierarchy, identifies one of a plurality of agents to train the classifier and notifies the identified agent to train the classifier, wherein the controller identifies agents by assigning a classifier to each agent and then assigning unassigned classifiers to agents based on complexities of training the unassigned classifiers and complexities of training classifiers already assigned to each agent, wherein an unassigned classifier with the highest complexity is assigned to an agent that has been assigned classifiers with the smallest total complexity, and wherein the complexity of training a classifier varies nonlinearly based on number of documents in the training data for that classifier, each classifier for a classification being trained using documents classified into the classification of which the classification is a sub-classification; and
the plurality of agents executing on different computer devices that receive notifications to train classifiers and train the classifiers using the features of the documents identified for each classification from the training data
wherein the classifiers trained by the multiple agents form the hierarchical classifier.

11. The computer system of claim 10 wherein a classifier is a binary classifier for a classification that classifies documents within that classification as being within or not within a sub-classification.

12. The computer system of claim 10 wherein the classifiers are binary classifiers and the training of a classifier uses a multi-fold cross validation technique to determine a confidence threshold for being within a classification.

13. The computer system of claim 12 wherein the confidence threshold is based on a middle point of a largest interval with a maximum F1 score.

14. A computer-readable storage medium containing instructions for controlling a computer to train a hierarchical classifier for classification into classification hierarchy, by a method comprising:
providing the classification hierarchy in which classifications have sub-classifications except for leaf classifications;
training data for training classifiers of the hierarchical classifier, the training data including documents and classifications of the documents within the classification hierarchy, the classification of a document indicating that the document is in that classification and ancestor classifications of that classification, each classification having a number of documents; and
for each classifier of a classification within the classification hierarchy,
determining a complexity for the classifier for the classification, the complexity of the classifier varying nonlinearly based on the number of documents within the classification;
identifying one of a plurality of agents to train the classifier based on complexities of classifiers assigned to the agent and the determined complexity of the classifier such that one agent is identified to train one classifier and some of the agents are identified to train multiple classifiers, the agents being identified to balance training load of the agents that is determined based on the determined complexity of training the classifiers identified to be trained by each agent wherein the identifying of one of the agents includes:
when a classifier has not yet been assigned to an agent, assigning the classifier to that agent; and
when a classifier has already been assigned to each agent, assigning the classifier to an agent based on complexity of the classifier and complexities of classifiers assigned to each agent such that a classifier with the highest complexity is assigned to an agent that has been assigned classifiers with the smallest total complexity; and
notifying the identified agent to train the classifier using training data that includes documents and classifications.

15. The computer-readable storage medium of claim 14 wherein features for use in training each classifier are automatically selected based on analysis of training data.

* * * * *